United States Patent [19]

Jayant

[11] 4,375,581
[45] Mar. 1, 1983

[54] DIGITAL TRANSMISSION ERROR REDUCTION

[75] Inventor: Nuggehally S. Jayant, Short Hills, N.J.

[73] Assignee: Bell Telephone Laboratories, Incorporated, Murray Hill, N.J.

[21] Appl. No.: 163,971

[22] Filed: Jun. 30, 1980

[51] Int. Cl.³ .............................................. H04J 6/02
[52] U.S. Cl. .................. 179/15.55 R; 371/31
[58] Field of Search .............. 179/15.55 R, 15.55 T; 371/39, 44, 31, 40, 45; 360/53, 38; 364/728, 737

[56] References Cited

U.S. PATENT DOCUMENTS

| | | | |
|---|---|---|---|
| 3,310,751 | 3/1967 | Atzenback | 328/163 |
| 3,404,373 | 10/1968 | Srinivasan | 371/40 |
| 3,444,516 | 5/1969 | Lechleider | 340/146.1 |
| 3,544,963 | 12/1970 | Tong | 340/146.1 |
| 3,568,147 | 3/1971 | Gilson | 340/146.1 |
| 3,638,182 | 1/1972 | Burton et al. | 340/146.1 |
| 4,054,863 | 10/1977 | Goodman et al. | 340/146.1 |
| 4,100,377 | 7/1978 | Flanagan | 179/15 |
| 4,145,683 | 3/1979 | Brookhart | 340/146.1 |
| 4,206,440 | 6/1980 | Doi et al. | 371/39 |
| 4,267,407 | 5/1981 | Schindler et al. | 179/15.55 R |

OTHER PUBLICATIONS

S. Lin, *Error-Correcting Codes,* Prentice Hall, Englewood Cliffs, N.J., 1972, see pp. 1–15, 112, 212, 213.
M. Mathieu, "A Random Access System etc.", SMPTE J., Feb. 1977, vol. 86, pp. 80–83.

*Primary Examiner*—Emanuel S. Kemeny
*Attorney, Agent, or Firm*—Jack S. Cubert; Kurt C. Olsen

[57] ABSTRACT

In a transmission system, reconstruction of a portion of the signal lost in transmission is based on signal encoding at the transmitter, and decoding at the receiver; at the transmitter, sequential portions of the signal are intermixed to form encoded portions, and autocorrelation factors (waveform feature signals) of the original portions are added to each encoded portion to form a packet; at the receiver, any missing packet is reconstructed from the adjacent received packet.

32 Claims, 13 Drawing Figures

FIG. 5 BLOCK STORE AND DEMULTIPLEXER

FIG. 6 PACKET LOSS DETECTOR

DIGITAL TRANSMISSION ERROR REDUCTION

TECHNICAL FIELD

This invention relates to digital processing of speech signals; and more particularly, to arrangements for reducing errors in speech signals sent over lossy channels.

The techniques for processing of speech signals over digital facilities are well known. While digital encoding improves the signal to noise ratio, noise and switching losses in digital systems may seriously impair the quality of the decoded signal. Impulse type noise can modify the bit pattern of one or more digital codes so that the intelligibility of the decoded signal is reduced.

Many schemes have been devised to overcome the effect of short-term channel noise. In one arrangement, disclosed in U.S. Pat. No. 4,145,683 issued Mar. 20, 1979 to Marshal R. Brookhart, a digitized audio signal is partitioned into frames. Parity words and error check words are generated for each frame. Individual errors are detected and algebraically corrected for each frame responsive to the parity and error check words. U.S. Pat. Nos. 3,544,963, issued Dec. 1, 1970 and 3,638,182, issued Jan. 25, 1972 disclose systems in which coded information is added to data prior to transmission so that individual or burst type errors can be corrected from the redundant information added to the transmission. The circuitry required for algebraic correction, however, is complex and the number of bits added for error correction detracts from the efficiency of transmission system.

Correction of individual errors is not necessary in speech signal transmission where only intelligibility and perceptual acceptability are important. U.S. Pat. No. 4,054,863 issued Oct. 18, 1977 to D. J. Goodman and R. Steele and assigned to the same assignee discloses an error reduction scheme in which a sequence of received signals is divided into blocks and each block is further partitioned into subblocks. For each block, a signal representative of the deviations of the coded signals therein is generated, as well as a signal representative of the deviations among the signals of the subblock. Upon detection of a subblock with deviations that exceed the block deviations, the subblock is altered to reduce its deviation. The loss of a significant portion of the block, however, makes it difficult to provide adequate error reduction.

In packet transmission of speech such as disclosed in U.S. Pat. No. 4,100,377 issued July 11, 1978, speech information is encoded and accumulated in a buffer store. A time stamp is associated with each talkspurt code to permit approximate reconstruction of the talkspurt time structure at a receiver. The encoded speech information is transformed into packets which are applied to a packet transmission network. Upon receipt of the packets, a replica of the speech signal is assembled from the time stamps in the packet headers. Some packets may not be delivered. Assuming all packets are delivered to the intended receiver eventually it is not possible to guarantee delivery of the speech signal packets in time for use in the construction of the speech replica. It is an object of the invention to provide an improved error reduction arrangement for speech signals subject to burst type losses or delays.

BRIEF SUMMARY OF THE INVENTION

The invention is directed to a signal processing arrangement in which an input signal is converted into a sequence of coded signals arranged in coded signal blocks. A signal representative of a feature of each block is generated. Each block is divided into a plurality of groups and the block feature signal is combined with each coded signal group of the block to form a coded signal packet.

According to one aspect of the invention, the block coded signal packets are transformed into a replica of the block signal. The coded signal packets of the block are assembled. Responsive to the absence of a coded signal packet of the block, a set of signals representative of the absent packet is produced from the block feature signal and at least one other coded signal packet of the block.

According to another aspect of the invention, each block is partitioned into first and second groups and the feature signal of the block is representative of the correlation between the coded signals of the first group and the coded signals of the second group. The set of signals corresponding to an absent packet is produced jointly responsive to the block correlation signal and the coded signals of the other packet of the block.

In accordance with an embodiment illustrative of the invention, a speech signal is sampled and encoded. The encoded samples are partitioned into successive blocks. A signal representative of the autocorrelation of the coded samples of each block is formed. The block is divided into an even coded sample group and an odd coded sample group and the autocorrelation signal is appended to each group to form a coded signal packet. The packets are then applied to a communication channel. Upon arrival at a destination receiver, the packets are decoded and combined to form a replica of the speech signal. Upon detection of an absent packet, each coded sample of said absent packet is approximated by combining the adjacent coded samples of the other block packet with the block autocorrelation signal.

DETAILED DESCRIPTION

Figure 1:
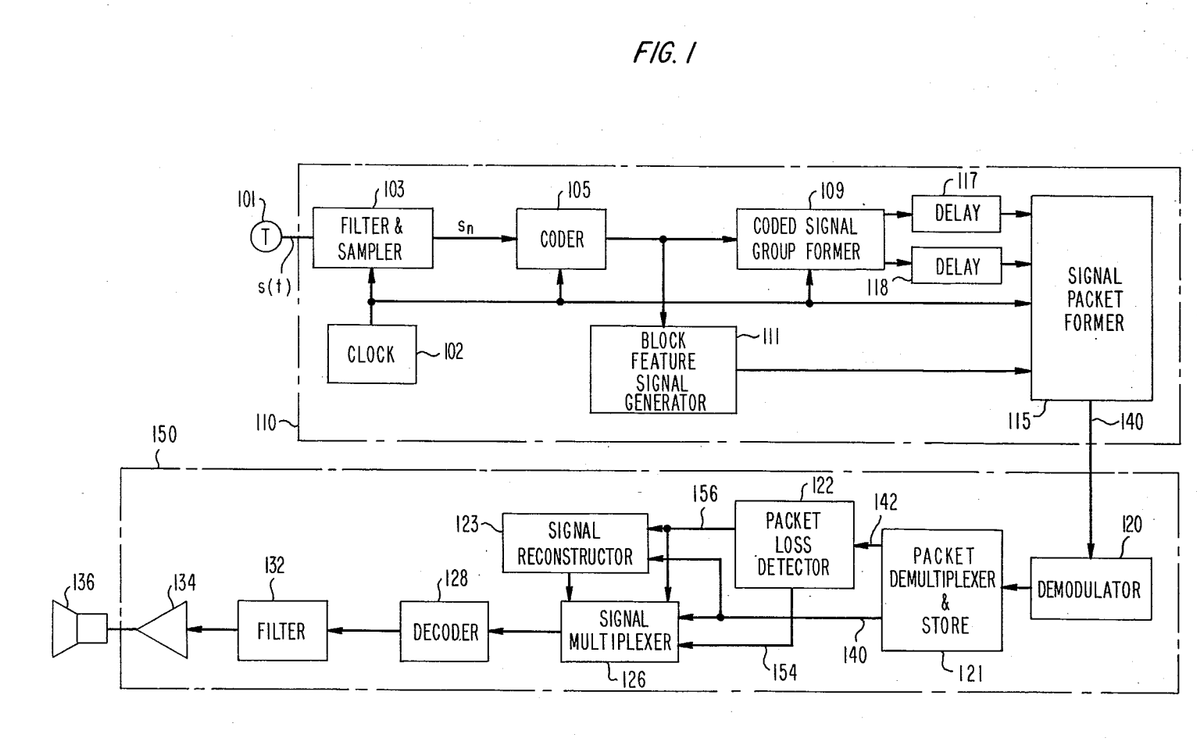
FIG. 1 depicts a general block diagram of a digital system illustrative of the invention.

FIG. 1 shows a general block diagram of a digital system incorporating an error reduction arrangement illustrative of the invention. Referring to FIG. 1, a speech signal s(t) is applied to filter and sampler circuit 103 from microphone 101. The filter and sampler circuit is operative to limit the bandwidth of the speech signal by removing higher frequency components and is further operative to sample the filtered signal at a rate determined by pulses from clock 102. The cutoff frequency of the low-pass filter may be set to 3.2 kilohertz as is well known in the art and the sampling rate may be 6.67 kilohertz.

The sample signals $s_n$ from filter and sampler circuit 103 are supplied to coder. A digital code corresponding to the magnitude of each sampled signal is formed in coder 105. The succession of digital codes from coder 105 are in a digital format that is compatible with the facility over which it is to be processed. Coder 105 may be a pulse code modulation (PCM) coder, a differential pulse code modulation (DPCM) encoder, an adaptive encoder, or other type coder well known in the art. The output of coder 105 is supplied to coded signal group former 109. Group former 109 separates the successive codes from coder 105 into a plurality of groups for each block of codes applied thereto. Feature signal generator 111 is effective to form a feature signal for each block of samples from coder 105.

Coded signal group former 109 may be adapted to form a first group of codes including the first, third, fifth and all odd codes of a block received from coder 105 and a second group including the second, fourth, sixth and all even codes of the block from coder 105. For an N code block divided into an odd group and an even group, the odd group codes may be $$u_1, u_3, u_5, \ldots, u_{N-1} \tag{1}$$

and the even group codes may be $$u_2, u_4, u_6, \ldots, u_N \tag{2}$$

The feature signal for the block sample signals produced by generator 111 may correspond to a prediction error coefficient C which permits the sample $u_n$ to be derived from the preceding sample $u_{n-1}$ in accordance with $$u_n = C \cdot u_{n-1} \tag{3}$$

The variance of the error between sample $u_n$ and preceding sample $u_{n-1}$ is $$E[p_n^2] = E[u_n^2][1 + C^2 - 2CR_{uu}(1)] \tag{4}$$

where, $$p_n = u_n - C \cdot u_{n-1} \tag{5}$$

$R_{uu}(1)$ is the autocorrelation function in accordance with $$R_{uu}(m) = E[u_n u_{n+m}]/E[u_n^2] \tag{6}$$

The variance minimizing coefficient C' obtained from Equation 4 by forming $$\partial(E[p_n^2])/\partial C = 0 \tag{7}$$

is $C' = R_{uu}(1)$

In the event that the codes of one group of the block are not available when the block is being reconstructed, it is readily seen that the missing group can be approximated from the received group and optimized prediction coefficient C'.

Alternatively, the samples of a missing group can be estimated by nearest neighbor interpolation in the form $$\hat{u}_n = A \cdot u_{n-1} + B \cdot u_{n+1} \tag{8}$$

where $u_n$ is a code from the missing group and $u_{n-1}$ and $u_{n+1}$ are the nearest neighbors of $u_n$ in the other group of the block. The interpolation error is $$i(n) = u_n - [A \cdot u_{n-1} + B \cdot u_{n+1}] \tag{9}$$

The optimized coefficients $A_o$ and $B_o$ obtained from an error variance analysis is then $$A_o = B_o = [R_{uu}(1)][1 + R_{uu}(2)]^{-1} \tag{10}$$

In similar manner, the interpolation or the predictive coefficients may also be used to reconstruct lost groups in coding arrangements where more than two groups are formed for each block.

The feature signal coefficient from generator 111 is supplied directly to signal packet former 115. One group of coded signals is supplied through delay 117 so that it can be combined with the feature coefficient and identification information to form a signal packet. The other group from former 109 is supplied through different length delay 118 to form yet another signal packet with the feature signal from generator 111.

The format of the signal packets for a block is $$\text{HDR}, A_o, u_1, u_3, u_5 \ldots u_{N-1}; \text{HDR}, A_o, u_2, u_4, u_6, \ldots u_N \tag{11}$$

A packet identification code $ID_n$ is placed in the header of each packet. The feature signal $A_o$ follows the header and the $u_n$ signals of the packet group follow the feature signal. The signal packets are then applied to communication channel 140. On communication channel 140, the packets of the block may be multiplexed with data or speech packets when other sources may be transmitted over different paths.

Circuit 150 is adapted to receive signal packets from channel 140 and to convert selected speech packets into a replica of the speech applied to microphone 101. The speech packets destined for circuit 150 are accepted by demodulator 120 and stored in packet demultiplexer and store 121. The header of each speech packet in store 121 includes packet identification information so that the packets may be assembled in proper order. The packets are assembled in accordance with the header identification information whereby the even packet of each block is adjacent to and follows the odd packet of the same block at the output of store 121.

The assembled sequence of packets is applied to signal multiplexer 126 which is operative to interleave the odd and even codes for each block and to supply the reassembled block to decoder 128. Decoder 128 may be any of the well known pulse modulation decoders corresponding to the coder 105. The output of decoder 128 is a sequence of signal samples. The sequence constitutes a replica of the speech signal applied to microphone 101. These speech samples are filtered in low-pass filter 132 to provide an analog replica of the speech signal. The analog replica is amplified in amplifier 134 and converted into soundwaves by transducer 136.

The packet sequence is also applied to packet loss detector 122. The loss detector is responsive to the header packet identification signals to determine whether a packet is absent in the assembled sequence. In the event a single packet is absent, a control signal is sent to signal reconstructor 123 and signal multiplexer 126 on line 156. Responsive to the control signal from detector 122, reconstructor 123 is operative to form a sequence of signals which represent the missing packet codes. These missing packet codes are generated jointly responsive to the other packet of the block and the feature signal in the block header.

The reconstruction may be implemented on the basis of prediction error coefficient $C'$ in accordance with Equation 3 or the nearest neighbor interpolation coefficient $A_o$ in accordance with Equation 8. The reconstructed coded signals are supplied to multiplexer 126. In the multiplexer, the reconstructed signals are interleaved with the signals of the received block packet. In this way, the effect of a lost packet segment of the speech signal is minimized.

While the probability of the loss of a single packet is significant, the loss of both packets of a block is a rare event. Upon detection of such a loss, loss detector 122 supplies a control signal to signal multiplexer 126 on line 154 which control signal causes the insertion of zero codes for the lost packet. The zero code packet insertion is effective to maintain the operation of decoder 128. As is readily seen, the circuit of FIG. 1 may be adapted to divide a block into three or more groups so that a missing packet can be reconstructed from one or more received packets of a block. The quality of speech obtained from the circuit of FIG. 1, however, may be reduced as the number of groups per block is increased if only one packet is utilized in the reconstruction. It may be preferable, therefore, to use as few groups as possible to obtain the highest quality of speech with burst error protection.

The circuit of FIG. 1 may be incorporated in a packet transmission system such as the type described in the aforementioned U.S. Pat. No. 4,100,377. It also can be used in communication systems where the quality of the transmission channel is not always assured. For example, the circuit of FIG. 1 can be used in a mobile radio arrangement in which one packet of a block is transmitted over a first channel and the second packet of the block is transmitted over another channel. Upon detection of the loss of one channel, the packets transmitted over that channel may be approximated from the packets received over the second channel. The invention is also applicable to other digital speech systems. For example, the coded information for a speech synthesizer may be stored in packet form utilizing the circuit of FIG. 1. In the event a packet is unavailable when needed for synthesis, the information content of the unavailable packet may be constructed from the other packet of the same block.

Figure 2:
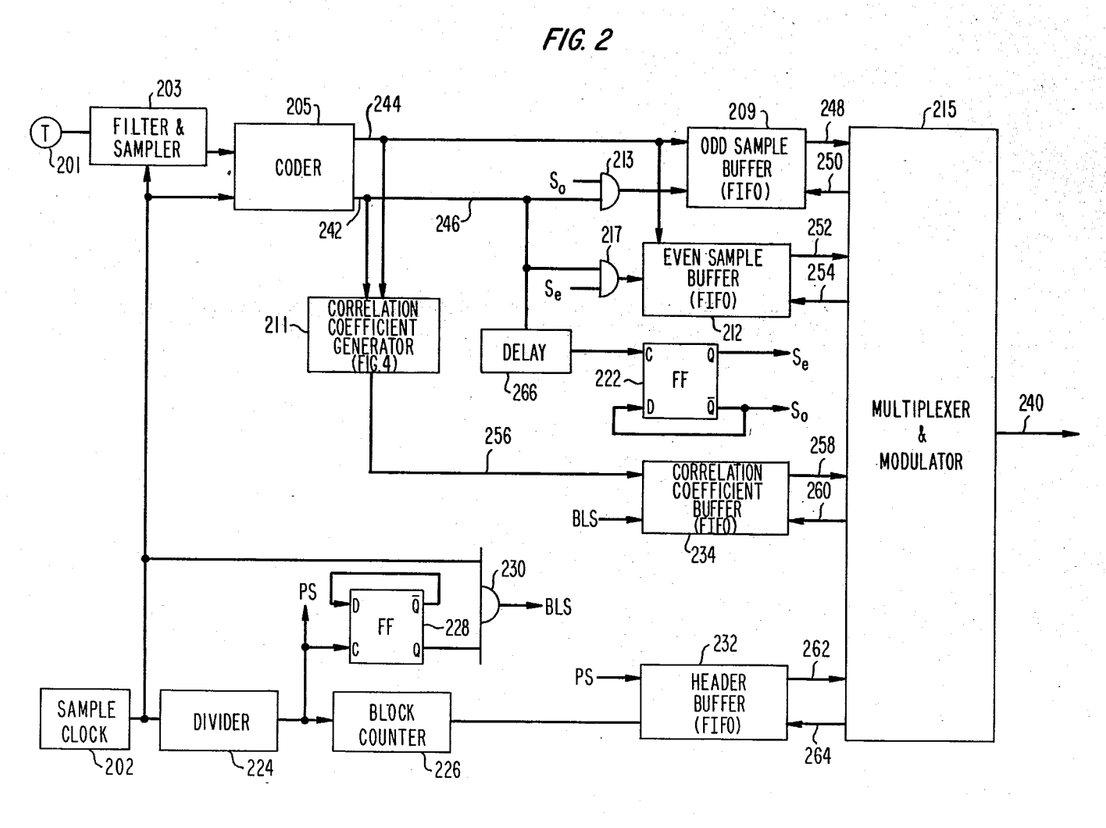
FIG. 2 depicts a block diagram of a digital coder including error reduction arrangements illustrative of the invention.

FIG. 2 depicts a block diagram of a digital speech signal coding arrangement useful in packet transmission systems that incorporates an error reduction arrangement illustrative of the invention. In FIG. 2, a speech signal obtained from microphone 201 is filtered in filter and sample circuit 203 as described with respect to FIG. 1. The successive samples from circuit 203 are converted into digital codes in coder 205 at a rate determined by sample clock 202. The sequence of coded samples from coder 205 are then supplied via line 240 to odd sample buffer 209, even sample buffer 212, and to correlation coefficient generator 211. In order 205, the output of sampler 203 is transformed into a PCM coded signal compatible with the digital channel on which it is to be transmitted. An analog to digital converter having suitable operating speed or any of the well known PCM coders may be used in coder 205. Alternatively, DPCM or ADPCM coders may be used. Clock signals from coder 205 are applied to AND-gates 213 and 217 and to correlation coefficient generator 211 via line 242.

Correlation coefficient generator 211 is adapted to provide a signal which relates the samples of the block to samples adjacent thereto. The correlation coefficient signal $A_c$ is given in Equation 10. As aforementioned, sample clock 202 provides successive pulses at a 6.67 kilohertz rate to sample the input speech. These pulses are also supplied to divider 224 in FIG. 2. The divider provides an output pulse PS at the start of each packet. Flip-flop 228 is connected to count down the PS packet start pulses by 2 and apply its output to AND-gate 230. Responsive to the output of flip-flop 228 and the clock sample pulses from clock 202, gate 230 generates a block start pulse BLS at the beginning of each code block.

Figure 4:
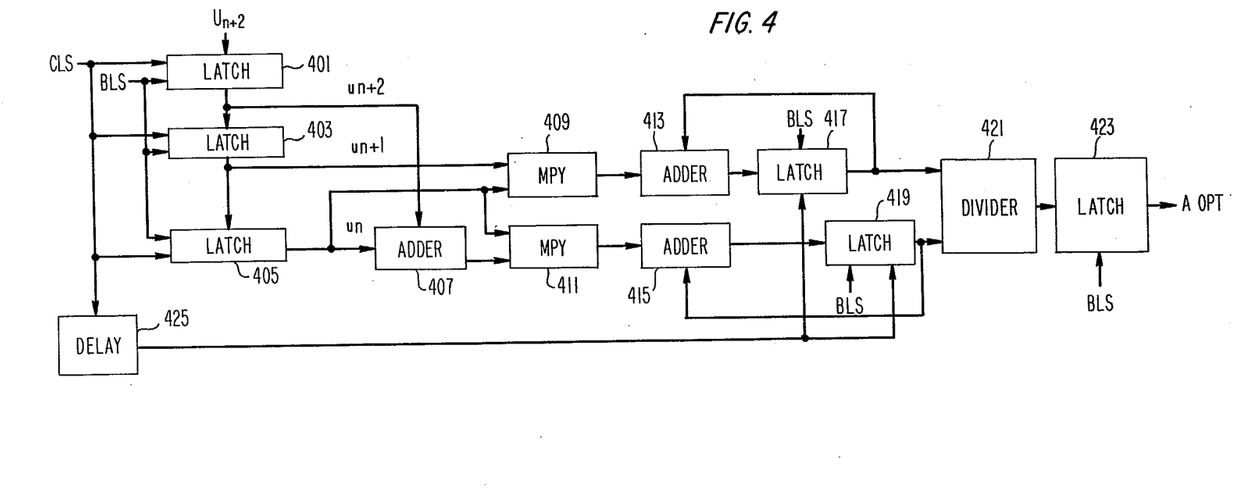
FIG. 4 shows a detailed block diagram of a correlation coefficient generator useful in the digital coder of FIG. 2.

FIG. 4 shows a more detailed block diagram of the correlation coefficient generator 211. Referring to FIG. 4, the block start pulse BLS is supplied to clear latches 401, 403, 405, 417, and 419 prior to the insertion of the coded signals of a block. After latches 401, 403 and 405 are cleared, the coded sample outputs from coder 205 are successively entered into latch 401 under control of sample clock pulse CLS. The samples are sequentially transferred to latch 403 and therefrom to latch 405. During each sample period of a block, the output of latch 405 is sample n while the outputs of latches 403 and 401 are samples n+1 and n+2, respectively. Adder 407 is operative to form the sum $$u_n + u_{n+2} \tag{12}$$

and to supply that sum to multiplier 411. Multiplier 411 provides the signal $$(u_n + u_{n+2})(u_n) \tag{13}$$

and multiplier 409 is operative to generate the signal $$(u_{n+1})(u_n) \tag{14}$$

Adder 413 and latch 417 form an accumulator so that the sum $$\sum_{n=1}^{N-2} (u_n + u_{n+2})u_n \tag{15}$$

appears at the output of latch 417 at the end of the block. Similarly, adder 415 and latch 419 form another accumulator and the sum $$\sum_{n=1}^{N-2} (u_{n+1})(u_n) \tag{16}$$

is available at the output of latch 419 at the end of the block. The signal $$A_o = \frac{\sum_{n=1}^{N-2}(u_{n+1})(u_n)}{\sum_{n=1}^{N-2}(u_n + u_{n+2})(u_n)} \qquad (17)$$

is produced in divider 421 responsive to the outputs of latches 417 and 419. The output of divider 421 is transferred to latch 423 by the BLS pulse for the succeeding block. Signal $A_o$ is then available at the output of the correlation signal generator at the end of each block. As indicated in FIG. 2, signal $A_o$ on line 256 is inserted into correlation coefficient buffer 234 by block start signal BLS.

Figure 10:
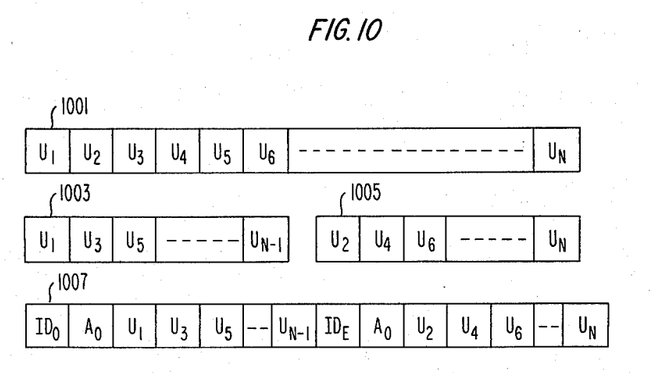
FIGS. 10-13 show waveforms useful in illustrating the operation of the coder circuit of FIG. 2 and the decoder circuit of FIG. 3.

The coded signals from coder 205 are in the order shown in waveform 1001 of FIG. 10. The clock signal outputs of coder 205 on line 246 are applied to the input of flip-flop 222 which is connected as a binary counter. Signal $S_o$ appears at the output of flip-flop 222 when an odd PCM code is available from coder 205 on line 244. Signal $S_e$ appears at the output of flip-flop 222 when an even PCM code is on line 244. The odd PCM codes are inserted into odd sample buffer 209 responsive to the operation of gate 213 as shown in waveform 1003 and the even PCM codes are inserted into even sample buffer 212 as shown in waveform 1005 responsive to the operation of gate 217.

Block counter 226 is a multistage counter which is incremented by signal PS at the beginning of each packet. Counter 226 provides a coded signal that is representative of the time of occurrence of each packet. These coded signals are placed in header buffer 232. Each of buffers 209, 212, 234, and 232 are arrangements of first-in, first-out memories such as the AM3341 type produced by Advanced Micro Devices or the FR1502E type produced by Western Digital Corporation, Newport Beach, Calif. As is well known in the art, the first-in, first-out type memory is operative to receive sequential information responsive to an input clock and to provide the information responsive to an output clock.

In the circuit of FIG. 2, multiplexer 215 provides clock signals to each of buffers 209, 212, 234, and 232 so that the block information from these buffers is assembled in predetermined order. After the block information is inserted into each of buffers 209, 212, 234, and 232, multiplexer 215 provides a clock signal on line 264 to read out the odd packet header code from buffer 232 on line 262. Multiplexer 215 then provides a clock signal to correlation coefficient buffer 234 via line 260 so that the $A_o$ signal therefrom is placed in the multiplexer subsequent to the packet identification code from buffer 232. The odd codes from buffer 212 are then inserted in order into multiplexer 215. In this manner, the odd packet of the block is assembled in multiplexer 215.

The even packet of the block is then assembled by retrieving the even block identification code from buffer 232. The correlation coefficient signal $A_o$ from buffer 234 and the succession of even samples from buffer 209 are then retrieved in that order. Multiplexer and modulator 215 is operative to assemble and modulate the packet signals of the block and to supply the packet signals to channel 240. As the signals of one block are assembled in multiplexer 215, the signals for the next succeeding block are generated and placed into the buffer memories of FIG. 2. The arrangement of the assembled packets of a block is shown in waveform 1007 of FIG. 10.

Figure 3:
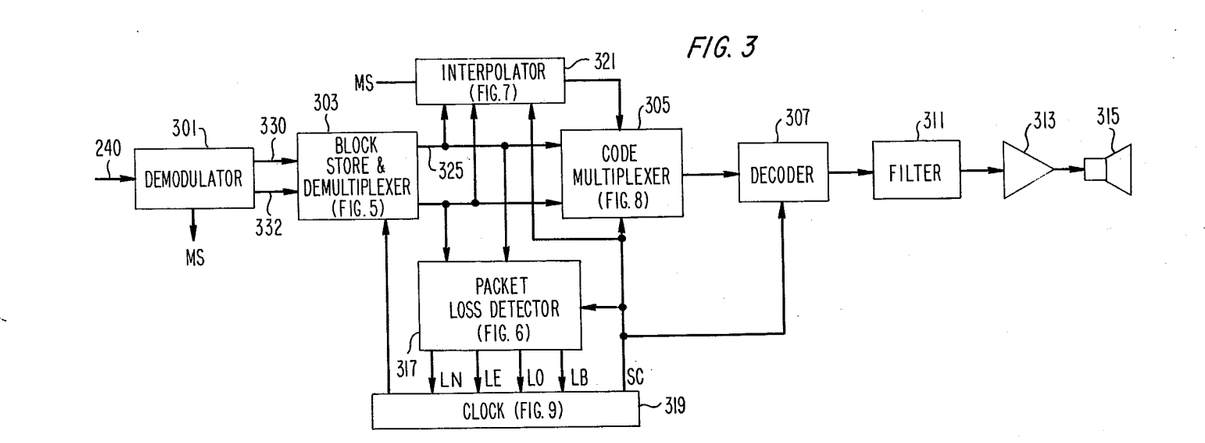
FIG. 3 depicts a block diagram of a decoder with error reduction arrangements illustrative of the invention.

The signal packets from the coder circuit of FIG. 2 are supplied to demodulator 301 of the receiver circuit shown in block diagram form in FIG. 3. After demodulation, the received packets are stored in block store and demultiplexer circuit 303. Demodulator 301 also supplies an MS message start signal to interpolator 321 when the presence of a new input message is detected. The packets are then retrieved in accordance with the packet header information. The coded packet data is supplied to code multiplexer 305 via line 325 at a rate determined by the receiver clock. Unless a missing packet is detected in packet loss detector 317, the odd packet coded samples and the even packet coded samples are interleaved in multiplexer 305. The resulting block coded signals are decoded in PCM decoder 307. The output of decoder 307 is a sequence of analog samples. These analog samples are low-pass filtered in filter 311 and the replica of the speech signal applied to microphone 201 is amplified in amplifier 313 and converted to soundwaves in transducer 315.

In the event that one of the block packets is absent at the time it is expected, loss detector 317 sends either an LE or an LO signal to clock 319. The LE signal indicates that an even packet is missing while the LO signal corresponds to a missing odd packet. Interpolator 321 is then turned on. Responsive to the block correlation signal $A_o$ present in the other packet header and the coded signals of the other packet, the lost packet signals are approximated in the interpolator. The approximated signals are then applied to multiplexer 305. The approximated signals are interleaved with the received packet signals in multiplexer 305 and the resultant block is sent to decoder 307.

Figure 5:
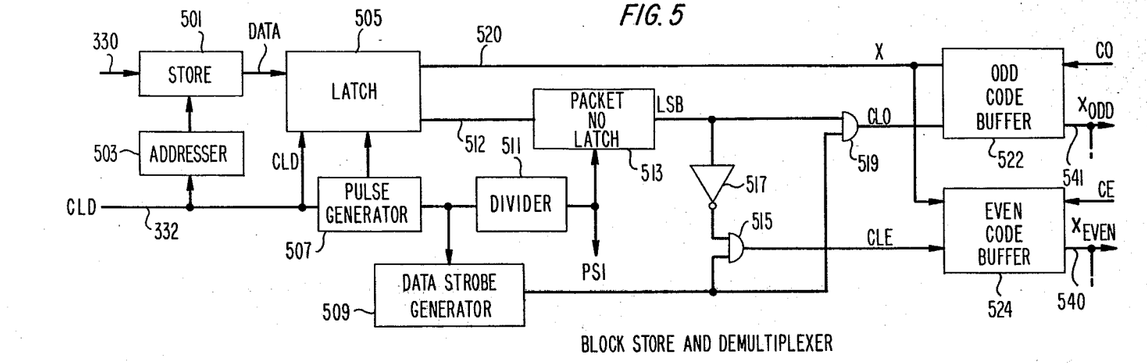
FIG. 5 shows a detailed block diagram of a block store and demultiplexer circuit useful in the decoder of FIG. 3.

Block store and demultiplexer circuit 303 is shown in greater detail in FIG. 5. Referring to FIG. 5, store 501 receives the demodulated packets from demodulator 301 over line 330. Addresser 503 obtains clocking signal CLD from demodulator 301 over line 332. These clocking signals cause addresser 503 to insert the demodulated packet information into successive positions of store 501. Addresser 503 is also operative to sequentially retrieve the packets from store 501 in accordance with the packet identification information of the packet headers.

The coded signals of the packets of a block are applied to latch 505 and therefrom to odd code buffer 522 and even code buffer 524 via line 520 under control of clock signal CLD. The CLD clock signals are also applied to pulse generator 507. The output of generator 507 is counted down in divider 511 from which a packet signal PS1 is obtained at the start of each packet. Responsive to signal PS1, the least significant bit of the packet identification number from latch 505 is placed in packet number latch 513. The least significant bit in latch 513 is a one signal for an odd packet and a zero signal for an even packet. Gate 515 is enabled when an even packet is available at the output of latch 505 on line 520 and gate 519 is enabled if an odd packet is available at the output of latch 505.

Clock signals CLD from demodulator 301 cause a succession of data strobe pulses to be generated in generator 509. These strobe pulses are operative to selectively insert the packet codes in either odd code FIFO buffer 522 or even code FIFO buffer 524. In the transfer of each block from store 501 to buffers 522 and 524, the even packet codes are first supplied to latch 505. Data strobe pulses from generator 509 pass through gate 515 and cause the even packet codes to be successively inserted into buffer 524. The PS1 signal from divider 511 then inserts the least significant bit of the odd packet into latch 513 so that the next packet is strobed into odd code buffer 522 via gate 519. The storage capacity of each of buffers 522 and 524 is at least sufficient to store two successively applied packets. In this manner, an input block may be supplied to the buffers while the preceding block is processed in packet loss detector 317, interpolator 321, and code multiplexer 305.

Figure 6:
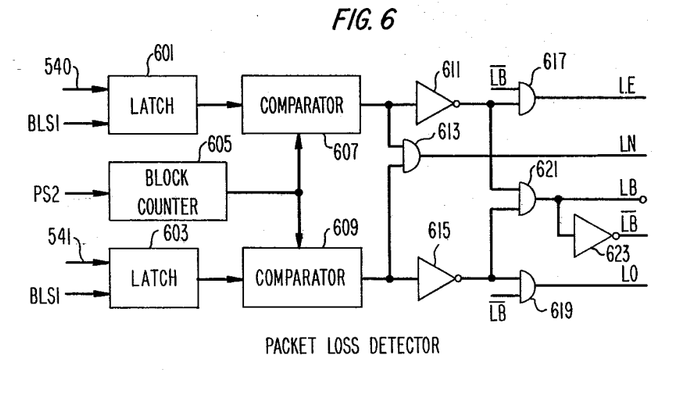
FIG. 6 shows a detailed block diagram of a packet loss detector circuit useful in the decoder of FIG. 3.
Figure 9:
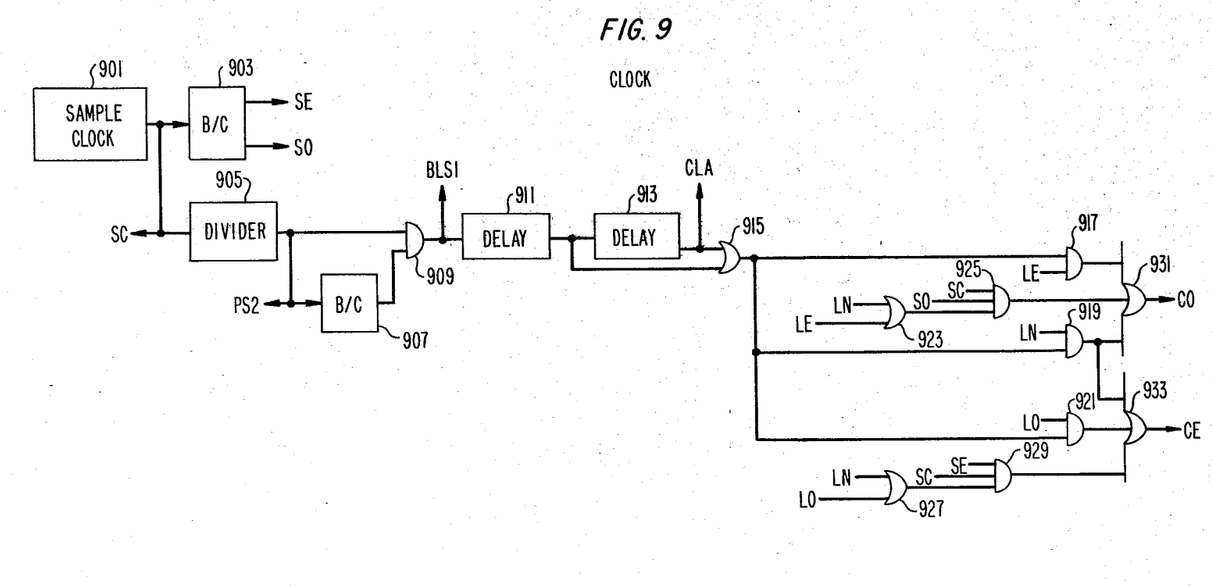
FIG. 9 shows a detailed block diagram of a clock circuit useful in the decoder of FIG. 3.

Packet loss detector 317 and clock 319 are shown in greater detail in FIGS. 6 and 9, respectively. Referring to FIG. 9, sample clock 901 provides a succession of clock signals SC at the code transfer rate, e.g., 6.67 kilohertz, to PCM decoder 307. The sample clock signals SC are transformed into alternate even sample pulses SE and odd sample pulses SO by binary counter 903. Divider 905 is operative to provide a PS2 signal at the beginning of each packet and binary counter 907 counts down by 2 so that the output of AND-gate 909 provides a signal (BLS1) occurring at the beginning of each block.

The block beginning signal (BLS1) from gate 909 transfers the block number codes from even code buffer 524 and odd code buffer 522 to latches 601 and 603 in FIG. 6 via leads 540 and 541, respectively. The least significant bit (LSB) of the block numbers are not placed in latches 601 and 603. At this time, the PS2 packet signal increments block counter 605 so that the counter stores the block number expected to be processed. The output of latch 601 is compared to the block number in counter 605 in comparator 607. Similarly, the output of latch 603 is compared to the block number in counter 605 in comparator 609. The LSB of counter 605 is not connected to comparators 607 and 609. If the block number of the even packet in latch 601 matches the block number in counter 605, the output of comparator 607 is high. Similarly, if the odd packet block number in latch 603 latches the block number in counter 605, the output of comparator 609 is high. AND-gate 613 is then turned on and an LN signal obtained therefrom. The LN signal indicates that both odd and even blocks have been received.

An odd block is considered lost when the block number in latch 603 is different than the expected block number stored in counter 605. Upon detection of a mismatch in comparator 609, gate 613 is inhibited and an LO signal is obtained from AND-gate 619. In like manner, the loss of an even block is detected at the output of comparator 607. A low signal at the output of comparator 607 inhibits AND-gate 613 but provides an LE signal from gate 617. In the event that the block numbers in both latches 601 and 603 do not match the block number in counter 605, gate 613 is inhibited and gate 621 provides an LB output indicative of the loss of both packets. Only one of the signals LN, LE, LO, and LB is turned on as a result of the operation of packet loss detector 317.

The output of delay 911 in FIG. 9 passes through OR-gate 915 and is applied to AND-gates 917, 919, and 921. Where both packets of the block are determined to be valid during the delay period in delay 911, the delayed BLS1 pulse from gate 915 passes through AND-gate 919 to provide clock signals CO and CE at the outputs of OR-gates 931 and 933. The CO pulse from OR-gate 931 retrieves the feature signal $A_o$ from odd code buffer 522 in FIG. 5 and supplies the feature signal to AND-gates 701 and 703 in the interpolator circuit shown in FIG. 7. Pulse CLA from delay 913 in FIG. 9 is operative to insert only $A_o$ output from gates 701 or 703 into latch 707. Neither of gates 701 or 703 is enabled since signals LE and LO are both inhibiting. Signal $A_o$ is removed from the speech signal block but is not supplied to decoder 307.

Figure 11:
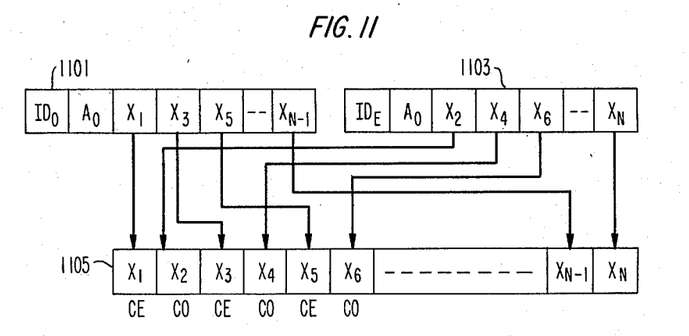

After the feature signal $A_o$ is deleted from buffers 522 and 524, signals LN, SC, and SO turn on gate 925 in FIG. 9. All odd clock signals CO are obtained from OR-gate 931. Similarly, signals LN, SC, and SE turn on AND-gate 929 whereby all even clock pulses CE are obtained from OR-gate 933. Responsive to the alternating CO and CE pulses, the odd packet codes $x_{odd}$ from buffer 522 shown in waveform 1101 of FIG. 11 and the even packet codes $x_{even}$ from buffer 524 shown in waveform 1103 of FIG. 11 are retrieved in alternating intervals. The coded signals are transferred to code multiplexer 305 which is depicted in greater detail in FIG. 8. The $x_{even}$ codes are applied to AND-gate 811 while the $x_{odd}$ codes are applied to AND-gate 813. When both even and odd packets are determined to be valid in loss detector 317, signal LN alerts both gates 811 and 813. Signals LO, LE, and LB disable AND-gates 801, 803, and 809, respectively. The $x_{even}$ codes pass through AND-gates 811 and the $x_{odd}$ codes pass through gate 813. The $x_{even}$ and $x_{odd}$ codes are interleaved in gate 815 so that the block codes are supplied to PCM decoder 307 in proper order as indicated in waveform 1105 of FIG. 11. As previously described, the decoded speech samples from decoder 307 are converted into a speech segment in filter 311, amplifier 313, and transducer 315.

If the packet in buffer 522 is not part of the block expected, the identication block code $ID_o$ inserted in latch 603 of FIG. 6 does not match the block number in counter 605 whereby a high LO signal is obtained from AND-gate 619. The high LO signal alerts gate 701. The $A_o$ feature signal retrieved from even code buffer 524 passes through AND-gate 701 and OR-gate 708. The $A_o$ feature signal is then inserted into latch 707 responsive to the CLA clock signal obtained from delay 913 in FIG. 9. The high LO signal passes through OR-gate 927 and permits the generation of CE buffer clock signals in AND-gate 929 and OR-gate 933. The CO odd buffer clock signals are not generated since AND-gate 925 is inhibited by the low LE and low LN signals applied thereto via OR-gate 923. Consequently, only the even codes are obtained from even-code buffer 524.

Figure 7:
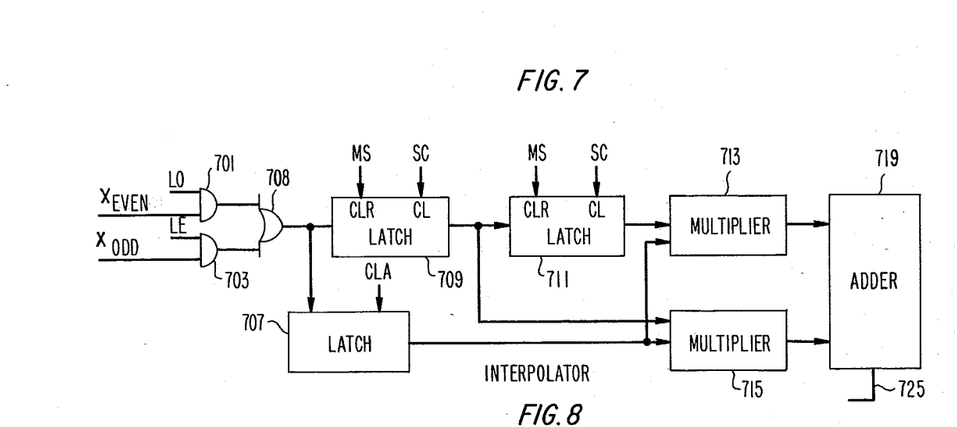
FIG. 7 shows a detailed block diagram of an interpolator circuit useful in the decoder of FIG. 3.
Figure 8:
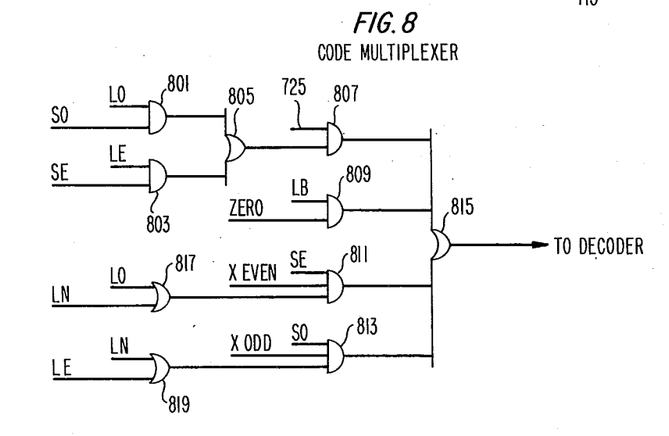
FIG. 8 shows a detailed block diagram of a code multiplexer circuit useful in the decoder of FIG. 3.

The even codes $x_{even}$ are applied to gate 811 in FIG. 8 and to gate 701 in FIG. 7. The LO signal on gate 817 permits the $x_{even}$ codes to pass through gate 811 during the even clock periods. The $x_{even}$ codes from gate 701 are supplied to latch 709 and are transferred therefrom by clock signal SC to latch 711. Latches 709 and 711 are cleared at the beginning of the message by signal MS from demodulator 301. Jointly responsive to the $x_{even}$ code in latch 709 and the $A_o$ feature signal in latch 707, multiplier 715 is operative to form the signal $$A_o x_{n-1} \tag{18}$$

Similarly multiplier 713 forms the signal $$A_o x_{n+1} \tag{19}$$

from the outputs of latch 711 and latch 707. The signals from multipliers 713 and 715 are summed in adder 719 to form the approximated odd code signal $$\tilde{x}_n = A_o x_{n-1} + A_o x_{n+1} \tag{20}$$

Figure 12:
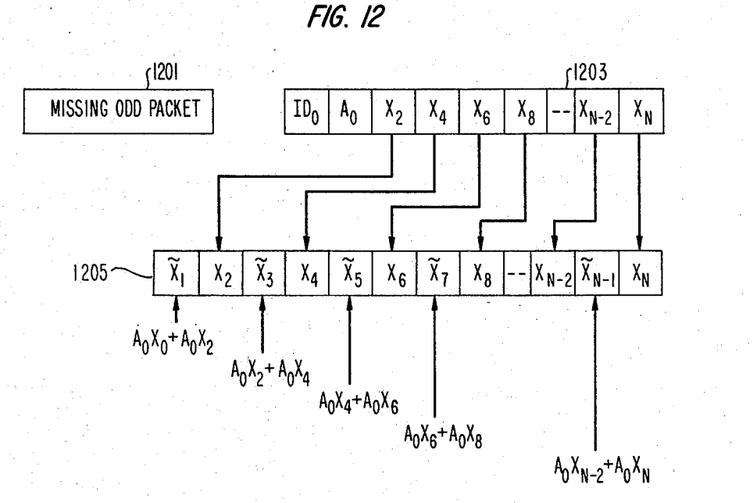

Gate 807 permits the approximated odd code to be supplied to decoder 307 in each odd clock period responsive to the LO and SO signals on gate 801. In this manner the received even codes are interleaved with the approximated odd codes from interpolator 321 and the quality of the resulting speech output is maintained in the presence of a packet loss. The interleaving of the received even codes and the approximated odd codes is generally indicated in FIG. 12. Waveform 1203 shows the received even packet. Waveform 1201 shows the missing odd packet and waveform 1205 shows the interleaved approximated odd codes and the received even codes at the output of code multiplexer 305.

Where the even packet of a block is not placed in buffer 524 when expected, loss detector 317 provides an LE output. The LE output causes interpolator 317 to form a sequence of approximated even code signals which signals are interleaved with the received odd code signals in code multiplexer 305 as previously described with respect to lost odd code signals.

Figure 13:
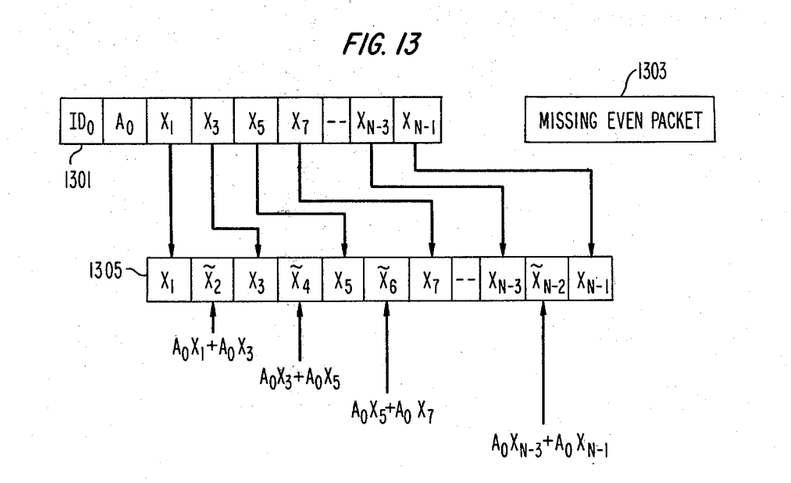

The waveforms of FIG. 13 illustrated the formation and interleaving of received odd codes and approximated even codes. Waveform 1301 shows the received odd code packet. Waveform 1303 indicates the missing even code pocket and waveform 1305 generally illustrates the interleaving of the approximated even codes with the received odd code packet. If both even and odd packets are not in in buffers 522 and 524, when expected, the block designation codes in the packet headers do not match the output of block counter 605. Consequently gate 621 provides an LB output corresponding to the loss of both packets. The generation of the LB signal forces the outputs of AND-gates 617 and 619 low. Since each of signals LN, LE, and LC are low, gates 917, 919, 925, and 929 in FIG. 9 are inhibited. No CE or CO pulse is produced to retrieve the coded signals in buffer 522 and 524. Gates 807, 811, and 813 in the code multiplexer circuit of FIG. 8 are inhibited. Signal LB, however, alerts gate 809 and a sequence of zero PCM codes are supplied to decoder 307 via gates 809 and 815. The zero codes maintain the continuity of operation of decoder 307 upon loss of an entire block.

The invention has been described with reference to an illustrative embodiment thereof. It is to be understood that various modifications and changes may be made by one skilled in the art without departing from the spirit and scope of the invention. For example, the invention may be used in signal processors other than speech signal processors where improvement of the quality of the signal is desired but individual error correction is not necessary.

I claim:

1. A signal processing arrangement comprising: means for receiving an input signal; and means for converting segments of said input signal into coded signal packets
    characterized in that
    said converting means (110) comprises means (103, 105) responsive to said input signal for generating a sequence of coded signals; means (103, 105) responsive to the sequence of coded signals for forming coded signal blocks, each block corresponding to an input signal segment; means (109) for dividing each block of coded signals into a plurality of groups; means (111) responsive to the coded signals of each block for generating a signal representative of a waveform feature of the corresponding input signal segment, the waveform feature signal of each block being adapted to modify one coded signal group of the block to approximate another coded signal group of the block; and means (115) for combining the waveform feature signal of each block with each coded signal group of said block to form said coded signal packets.

2. A signal processing arrangement according to claim 1 further comprising means for transforming said coded signal packets into a replica of the block signal;
    characterized in that
    said transforming means (150) comprises means (121) for assembling the coded signal packets of said block; means (122) responsive to said assembled block coded signal packets for detecting the absence of a block coded signal packet; means (123) responsive to the operation of said detecting means for generating a set of signals representative of the absent coded signal packet from the block waveform feature signal and at least one other coded signal packet of the block.

3. A signal processing arrangement according to claim 2 further
    characterized in that
    said dividing means (109) comprises means (209, 212, 213, 217, 222) for partitioning each block into first and second groups; and said block waveform feature signal generating means (111) comprises means (211) for generating a signal representative of the correlation of the coded signals of said first group and the coded signals of said second group.

4. A signal processing arrangement according to claim 3 further
    characterized in that
    said means (123) for generating a set of signals representative of the absent coded signal packet comprises means (321) jointly responsive to the block correlation signal and the coded signals of the other packet for producing a set of coded signals corresponding to the absent packet coded signals.

5. A signal processing arrangement according to claim 4 further
    characterized in that
    said block partitioning means (209, 212, 213, 217, 222) is adapted to form a first set of coded signals $u_2, u_4, \ldots u_N$ corresponding to the even coded signals of the block and a second set of coded signals $u_1, u_3, \ldots u_{N-1}$ corresponding to the odd coded signals of the block from the block coded signals $u_1, u_2, u_3, u_4, \ldots u_N$; and said correlation signal generating means (211) is adapted to generate a signal representative of the correlation of each coded signal of one set of coded signals to the adjacent coded signals of the other set of coded signals.

6. A signal processing arrangement according to claim 5 further
    characterized in that
    said means (321) for producing a set of coded signals corresponding to the absent coded signal pocket is adapted to combine the correlation signal with each successive pair of coded signals of the other block packet to form a signal which approximates the coded signal of the absent coded signal packet intermediate the successive coded signals of said pair.

7. A signal processing arrangement according to claim 1 further comprising means for transforming said block coded signal packets into a replica of the block input signal;
characterized in that
said transforming means comprises means (305) for selecting at least one block coded signal packet; and means (321) jointly responsive to the coded signals of said selected block coded signal packet and the block waveform feature signal for generating signals representative of the other coded packets of said block.

8. A method for processing signals comprising the steps of receiving an input signal, and converting segments of said input signal into coded signal packets
characterized in that
said input signal converting step comprises generating a sequence of coded signals responsive to said input signal; arranging the sequence of coded signals in successive coded signal blocks, each block corresponding to an input signal segment; dividing each block of coded signals into a plurality of groups; generating a signal responsive to the coded signals of each block representative of a waveform feature of the segment of the input signal corresponding to the block, the waveform feature signal of each block being adapted to modify one coded signal group of the block to approximate another coded signal group of the block; and combining the waveform feature signal of each block with each coded signal group of said block to form said coded signal packets.

9. A method for processing signals according to claim 8 further comprising transforming said coded replica of said input signal;
characterized in that
said transforming step comprises assembling the coded signal packets of each block; producing responsive to the absence of a block coded signal packet in said assembled packets a set of signals representative of the absent coded signal packet from the block waveform feature signal and the coded signals of at least one other coded signal packet of the block.

10. A method for processing a signal according to claim 9 further
characterized in that
the dividing of a block into a plurality of groups comprises partitioning the block into first and second groups; and the block waveform feature signal generation comprises producing a signal representative of the correlation of the coded signals of the first group and the coded signals of the second group.

11. A method for processing a signal according to claim 10 further
characterized in that
producing a set of signals representative of the absent coded signal packet comprises generating a set of coded signals corresponding to the absent packet coded signals jointly responsive to the block correlation signal and the coded signals of the other coded signal packet of the block.

12. A method for processing a signal according to claim 11 further
characterized in that
the block partitioning comprises forming a first set of coded signals $u_1, u_3, u_5, \ldots u_{N-1}$ corresponding to the odd occurring coded signals of the block and a second set of coded signals $u_2, u_4, u_6, \ldots u_N$ corresponding to the even occurring signals of the block; and the generation of the correlation signal comprises producing a signal representative of the correlation of each coded signal of one set of coded signals to the adjacent coded signal of the other set of coded signals.

13. A method for processing a signal according to claim 12 further
characterized in that
the producing of a set of coded signals corresponding to the absent packet coded signals comprises combining the correlation signal of the block with a successive pair of coded signals of the other set of coded signals of the block to form a signal which approximates the coded signal of the absent packet intermediate the successive coded signals of said pair.

14. A method for processing signals according to claim 8 further comprising the step of transforming said block coded signal packets into a replica of the block signal;
characterized in that p1 said transforming step includes selecting at least one of said block coded signal packets; and generating signals representative of other coded signal packets of the block waveform from the block feature signal and the selected coded signal packet of the block.

15. A speech signal communication system comprising means for receiving an input speech signal, means for converting segments of said input speech signal into successive coded signal packets; and means for applying said coded signal packets to a communication channel; said converting means comprising means responsive to said input speech signal for generating a sequence of coded signals; means responsive to the sequence of coded signals for forming coded signal blocks, each block corresponding to an input speech signal segment; means for dividing each block of coded signals into a plurality of groups; means responsive to the coded signals of each block for generating a signal representative of a waveform feature of the corresponding input signal segment, the waveform feature signal of each block being adapted to modify one coded signal group of the block to approximate another coded signal group of the block; and means for combining the block waveform feature signal of each block with each coded signal group of said block to form said coded signal packets.

16. A speech signal communication system according to claim 15 further comprising means for transforming the speech signal packets from said communication channel into a replica of said speech signal segment including means for assembling the coded signal packets of said block; means responsive to the assembled coded signal packets for detecting the absence of a block coded signal packet; means responsive to the operation of said detecting means for generating a set of signals representative of the absent block coded signal packet from the block waveform feature signal and at least one other coded signal packet of the block.

17. A speech signal communication system according to claim 16 wherein said dividing means comprises means for partitioning each block into first and second groups of coded signals; and said block waveform feature signal generating means comprises means for generating a signal representative of the correlation of the coded signals of the first group and the coded signals of the second group.

18. A speech signal communication system according to claim 17 wherein said means for generating a set of signals representative of the absent coded signal packet of a block comprises means jointly responsive to the correlation signal of the block and the coded signals of the other packet for producing a set of coded signals corresponding to the coded signals of the absent packet.

19. A speech signal communication system according to claim 18 wherein said block partitioning means comprises means responsive to the coded signals of the block $u_1, u_2, u_3, u_4 \ldots u_N$ for selecting a first set of alternately occurring coded signals $u_1, u_3 \ldots u_{N-1}$ and a second set of alternately occurring coded signals $u_2, u_4, \ldots u_N$; and said correlation signal generating means comprises means for producing a signal representative of the correlation of each coded signal of one of said first and second sets with the adjacent coded signals of the other of said first and second sets.

20. A speech signal communication system according to claim 19 wherein said means for producing a set of coded signals corresponding to the absent coded signal packet comprises means for combining the block correlation signal with each pair of successive coded signals of the other coded signal packet to form a signal approximating the coded signal of the absent coded signal packet intermediate the successive coded signals of said pair.

21. In a speech communication system, a method for processing speech signals comprising the steps of receiving an input speech signal; converting segments of said input speech signal into successive digitally coded signal packets; and applying said digitally coded signal packets to a communication channel; said input speech signal converting step comprising the steps of generating a sequence of coded signals responsive to said input signal; forming coded signal blocks responsive to the sequence of coded signals, each block corresponding to an input speech signal segment; dividing each block of coded signals into a plurality of groups; generating a signal responsive to the coded signals of each block representative of a waveform feature of the corresponding input signal segment, the waveform feature signal of each block being adapted to modify one coded signal group of the block to approximate another coded signal group of the block; and combining the waveform feature signal of each block with each coded signal group of said block to form said coded signal packets.

22. In a speech communication system, the method for processing speech signals according to claim 21 further comprising the step of transforming the speech signal packets from said communication channel into a replica of said speech signal segment including assembling the coded signal packets of said block; detecting the absence of a block coded signal packet responsive to the assembled coded signal packets; generating a set of signals representative of the absent block waveform coded signal packet from the block feature signal and at least one other coded signal packet of the block responsive to the detection of said absent packet.

23. In a speech communication system, the method of processing of speech signals according to claim 22 wherein said block dividing step comprises partitioning each block into first and second groups of coded signals; and said block waveform feature signal generating step comprises generating a signal representative of the correlation of the coded signals of the first group and the coded signals of the second group.

24. In a speech communication system, the method of processing speech signals according to claim 23 wherein the generation of a set of signals representative of the absent coded signal packet of a block comprises; producing a set of coded signals corresponding to the coded signals of the absent block jointly responsive to the correlation signal of the block and the coded signals of the other packet of the block.

25. In a speech communication system, the method of processing a speech signal according to claim 24 wherein the block partitioning comprises selecting a first set of alternately occurring coded signals and a second set of alternately occurring coded signals from the successive coded signals of the block; and the generation of said correlation signal comprises producing a signal representative of the correlation of each coded signal of one of said first and second sets with the adjacent coded signals of the other of said first and second sets.

26. In a speech communication system, the method of processing a speech signal according to claim 25 wherein the producing of a set of coded signals corresponding to the absent coded signal packet comprises combining the block correlation signal with each pair of successive coded signals of the other coded signal packet to form a signal approximating the coded signal of the absent coded signal packet intermediate the successive coded signals of said pair.

27. A signal processing system in which a signal is represented by successive blocks of coded signals, each coded signal block corresponding to a waveform segment is divided into a plurality of groups, and each group is combined with a signal representative of a waveform feature of the corresponding segment to form a coded signal packet, the waveform feature signal of each block being adapted to modify one coded signal group of the block to approximate another coded signal group of the block, said signal processing system comprising means for receiving coded signal packets;
means for assembling the coded signal packets of said block;
means responsive to said assembled block coded signal packets for detecting the absence of a block coded signal packet; and
means responsive to the operation of said detecting means for generating a set of signals representative of the coded signal group of the absent coded signal packet responsive to the block waveform feature signal and at least one other coded signal group of the block.

28. A signal processing arrangement according to claim 27 in which each block is partitioned into first and second groups, and said block waveform feature signal is representative of the correlation of the coded signals of said first group and the coded signals of said second group, wherein said means for generating a set of signals representative of the coded signal group of the absent coded signal packet comprises means jointly responsive to the block correlation signal and the coded signal group of the other packet for producing a set of coded signals corresponding to the coded signal group of the absent coded signal packet.

29. A signal processing arrangement according to claim 28 wherein said means for producing a set of coded signals corresponding to the coded signal group of the absent coded signal packet is adapted to combine the correlation signal with each successive pair of coded signals of the other block packet to form a signal which approximates the coded signals of the absent coded signal packet intermediate the successive coded signals of said pair.

30. A method for processing signals in which a signal is represented by successive blocks of coded signals, each coded signal block corresponding to a waveform segment is divided into a plurality of groups, and each group is combined with a signal representative of a waveform feature of the corresponding segment to form a coded signal packet, the waveform feature signal of each block being adapted to modify one coded signal group of the block to approximate another coded signal group of the block, said signal processing method comprising the steps of receiving coded signal packets;
  assembling the coded signal packets of said block;
  detecting the absence of a block coded signal packet responsive to said assembled block coded signal packets;
  generating a set of signals representative of the coded signal group of the absent coded signal packet responsive to the block waveform feature signal and at least one coded signal group of the block.

31. A method for processing signals according to claim 30 in which each block is partitioned into first and second groups, and said block feature signal is representative of the correlation of the coded signals of said first group and the coded signals of said second group, wherein said step for generating a set of signals representative of the coded signal group of the absent coded signal packet comprises
  producing a set of coded signals corresponding to the coded signal group of the absent coded signal packet jointly responsive to the block correlation signal and the coded signal group of the other packet.

32. A method for processing signals according to claim 31 wherein said step for producing a set of coded signals corresponding to the coded signal group of the absent coded signal packet comprises the step of combining the correlation signal with each successive pair of coded signals of the other block packet to form a signal which approximates the coded signals of the absent coded signal packet intermediate the successive coded signals of said pair.

* * * * *

UNITED STATES PATENT AND TRADEMARK OFFICE
CERTIFICATE OF CORRECTION

PATENT NO. : 4,375,581
DATED : March 1, 1983
INVENTOR(S) : Nuggehally S. Jayant

It is certified that error appears in the above—identified patent and that said Letters Patent is hereby corrected as shown below:

In column 10, line 24, "AND-gates" should read --AND-gate--. Column 11, line 22, "illustrated" should read --illustrate--; line 26, "pocket" should read --packet--; line 35, "LC" should read --LO--. Column 12, line 60, "pocket" should read --packet--. Column 14, line 23, "characterized in that pl" should read --characterized in that--.

Signed and Sealed this

Sixth Day of September 1983

[SEAL]

Attest:

GERALD J. MOSSINGHOFF

Attesting Officer

Commissioner of Patents and Trademarks